Figure 1:
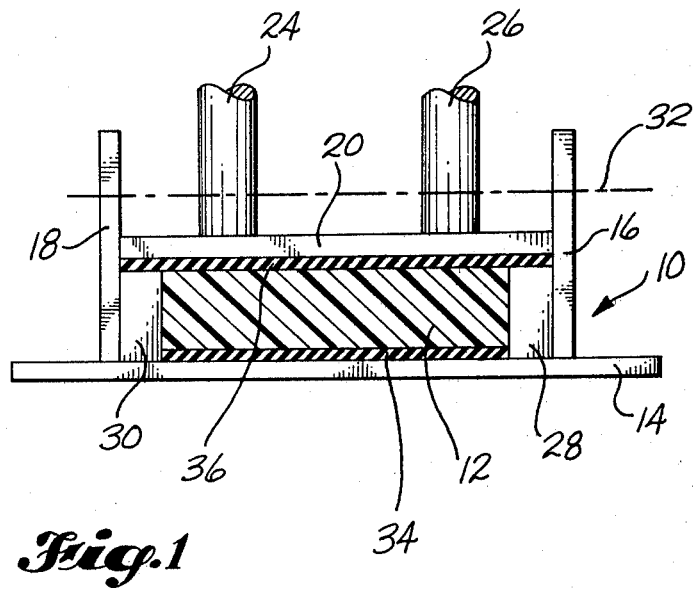

United States Patent [19]

Pollock et al.

[11] 4,454,248
[45] Jun. 12, 1984

[54] OPEN CELL RIGID THERMOSET FOAMS AND METHOD

[75] Inventors: Marlan R. Pollock, Renton, Wash.; Marlyn F. Harp, Winfred, Kans.

[73] Assignee: The Boeing Company, Seattle, Wash.

[21] Appl. No.: 427,457

[22] Filed: Sep. 29, 1982

[51] Int. Cl.³ .............................................. B29D 27/00
[52] U.S. Cl. ................................ 521/53; 264/45.3; 264/51; 264/321; 521/88; 521/98; 521/155
[58] Field of Search ................. 264/321, 44, 51, 45.3; 521/53, 88, 89, 155

[56] References Cited

U.S. PATENT DOCUMENTS

| | | | |
|---|---|---|---|
| 3,907,579 | 9/1975 | Ravault | 264/44 X |
| 4,134,945 | 1/1979 | Milford et al. | 264/321 X |
| 4,171,410 | 10/1979 | Fröb | 264/321 X |
| 4,265,965 | 5/1981 | Chancler | 264/321 X |
| 4,334,944 | 6/1982 | Crey | 264/321 X |

OTHER PUBLICATIONS

*Webster's New Collegiate Dictionary*, Springfield, Mass., G. & C. Merriam Co., ©1961, pp. 344, 452.
*Hackh's Chemical Dictionary*, Fourth Edition, Completely Revised and Edited by Julius Grant, New York, McGraw-Hill, ©1972, pp. 293, 294, 366.

Primary Examiner—Philip E. Anderson
Attorney, Agent, or Firm—Delbert J. Barnard; Eugene O. Heberer

[57] ABSTRACT

A rigid porous, deformation resisting, nonresilient inflexible thermoset resin foam having macroscopic open cells and the method of making the same. The method comprises foaming and partially curing a polyepoxide or polyurethane resin in which the cells are closed. The partially cured resin is softened by heating and then crushed to compress the cells to produce an open-celled product. The crushed foam is reexpanded and finally cured. The foam may be filled for strengthening with a filler such as carbon black before or after the final cure.

49 Claims, 1 Drawing Figure

OPEN CELL RIGID THERMOSET FOAMS AND METHOD

TECHNICAL FIELD

The invention relates to rigid thermoset open cell foams and the method of making the same. The foams are made from polyepoxide, and polyurethane resins. The foams are made with closed cells and then compressed to open the cells so that the foams can be impregnated.

BACKGROUND ART

In the prior art, closed-cell foam resins have been prepared from a mixture of a resin, a curing agent and a blowing agent, allowing the mixture to form a closed-celled foam, and thereafter curing the foamed product. Some of the closed-celled rigid foams in the prior art have substantial structural strength but are not porous to satisfy the requirements of the present invention. That is, there is no satisfactory way of impregnating the cells with the necessary filler material required for strengthening. In general, the foam materials in the prior art do not have both open cell structure and the rigidity necessary to provide products made therefrom with the necessary and desirable structural strength and stability required according to the invention.

In the prior art, when a crushing process has been applied to a fully cured rigid closed-cell foam, numerous problems have been encountered. For example, the material does not regain its original thickness and shape after the crushing technique is applied and the material sometimes crumbles and breaks.

A search of the patent literature discloses various foams and crushing processes. For example, U.S. Pat. No. 3,386,877 discloses a thermoplastic polyurethane in which a layer thereof is cooled and then crushed. The foam is flexible above the glass temperature to a sufficient degree to permit a desired degree of recovery after the foam has been crushed. A result is achieved by selectively varying the temperature of at least a first portion of a resinous foamed body, having a second order transition point and a plurality of closed cells having cell walls, to a temperature below its second order transition point (glass temperature) and compressing the body and rupturing cell walls of the first portion of the foam body while maintaining at least a second portion of the body above its second order transition point and not rupturing a major portion of the cell walls thereof.

In U.S. Pat. No. 3,709,843, flexible densified polyurethane foams are made for use as cushioning and rug padding. The flexible polyurethane is formed as a partially cured cellular material and then a compressive force is applied to the partially cured material to reduce its volume by a desired amount.

In U.S. Pat. No. 3,658,972, different densities of flexible polyurethane foam are achieved by allowing part of the foam to freely expand before cure is completed and then compressing the freely expanded portion. Thereafter the cure is completed.

U.S. Pat. No. 3,223,654, discloses a method for making a rigid epoxy foam.

The following patents disclose various polyurethane and polyepoxide foams.

| U.S. Pat. No. 2,117,605 | U.S. Pat. No. 3,094,433 |
| U.S. Pat. No. 2,739,134 | U.S. Pat. No. 3,112,524 |
| U.S. Pat. No. 2,789,095 | U.S. Pat. No. 3,129,191 |
| U.S. Pat. No. 2,811,499 | U.S. Pat. No. 3,171,820 |
| U.S. Pat. No. 2,831,820 | |
| U.S. Pat. No. 2,920,983 | U.S. Pat. No. 3,342,922 |
| U.S. Pat. No. 2,926,390 | U.S. Pat. No. 3,386,877 |
| U.S. Pat. No. 2,936,294 | U.S. Pat. No. 3,459,274 |
| U.S. Pat. No. 2,993,869 | U.S. Pat. No. 3,504,064 |
| U.S. Pat. No. 3,025,200 | U.S. Pat. No. 3,506,600 |
| U.S. Pat. No. 3,055,360 | U.S. Pat. No. 3,650,993 |
| U.S. Pat. No. 3,057,750 | U.S. Pat. No. 3,860,537 |
| U.S. Pat. No. 3,060,137 | U.S. Pat. No. 4,252,517 |
| U.S. Pat. No. 3,075,926 | Sweden 180,206 |
| U.S. Pat. No. 3,082,611 | France 1,287,637 |
| U.S. Pat. No. 3,090,094 | |

DISCLOSURE OF THE INVENTION

The invention is a foam and a method for making the same. The foam is deformation resisting, non-resilient, inflexible, rigid so as to have substantial strength and has cells that are generally macroscopic. The cells are open and are adapted to receive strengthening fillers.

The method comprises foaming and partially curing a foamable, curable resin, such as a polyepoxide, a polyurethane formed from a polyester polymer and an isocyanate compound, and a polyurethane formed from a polyether polymer and an isocyanate compound, and mixtures thereof. The partially cured and foamed resin is softened, then it is crushed by compressing the cellular material to a thickness less than its original thickness in order to cause the walls forming the cells to rupture to produce an open-celled product. The open-celled crushed foam is reexpanded and then given a final cure. The foam may be filled for strengthening with a filler such as carbon black before or after the final cure.

According to the invention, a foamable resin is used that can be partially cured and foamed to put it into a B-staged condition. A resin mixture or system that can be B-staged is a hardenable and curable material that can be given its initial cure at a relatively low temperature, such as room temperature, which will result in a relatively stable partially cured material that can be softened. A B-staged thermosetting material can be conveniently further cured only at elevated temperatures. A B-staged resin, according to the invention, can be softened by momentarily heating to an elevated temperature. The softened material, as a foam, can be crushed in a press, roller, or the like, without the material losing its cellular identity. In a material that has been B-staged, there is no appreciable further curing reaction of the material at the initial relatively low curing temperature. Upon heating to an elevated temperature, it is believed that there is additional cross-linking of the polymer chains which result in a solid infusable material. The partially cured resin according to the invention would cure at room temperature over a prolonged period of time.

The B-stageable material of the invention is capable of regaining the original expanded thickness and shape after it has been subjected to a mechanical treatment, that is, rolling, crushing or compressing between two plates, for example. The crushed foam is heated to a predetermined temperature for a predetermined time to enable the partially cured, or B-staged, material to regain its original thickness after being crushed.

A fully cured thermoset resin cannot be softened by heating to make it possible to rupture the cells. If the crushing of a thermoset resin is attempted, it crumbles and is permanently deformed. It will not regain its original shape and thickness after the mechanical treatment by heating it, as in the case of a resin that has been B-staged according to the invention.

According to the invention, the resin is mixed with a foaming agent in an amount sufficient to develop the desired foam. The mixture is B-staged by curing it at a relatively low temperature. The temperature is maintained for a time sufficient to foam and partially cure to produce a closed-cell foam material. The B-staged foam is then softened by quickly heating so that the resin can be compressed. The softened closed-cell foam is compressed between two plates to approximately one-half of its original thickness. This causes the cell walls to rupture and to produce an open-celled product which can be reexpanded to its original shape and size by heating to the same temperature range than that was generally required to soften for crushing. After reexpansion, the open-cell foam material is further heated to cure finally. It may be impregnated during this final heating or it may be impregnated after the cure has been completed.

The impregnation is accomplished by soaking the foam in a dispersion of filler material in a liquid carrier. After it has been soaked and the filler has impregnated the product, the foam is drained of the excess dispersion and allowed to dry to completion.

Such pregnated foams, according to the invention, are useful in the manufacture of radar domes, radar housing, wave-guide apparatus and in the manufacture of "invisible" airplanes in which the foams, in sheets, would form basic aircraft supporting structure and which would be covered with a thin skin of flexible fiberglass. Such airplanes would be invisible in the sense that they would not be detectable by radar or more modern detection systems, and would be substantially invisible to the eyes by being properly camouflaged.

When the finally cured foam, according to the invention, is not impregnated it may be used as a filter which has the structural strength necessary to maintain its shape under pressure in a fluid stream in various positions.

The rigidity of the foams according to the invention is such, in contrast to the prior art foams, for the uses mentioned that no additional structural bracing or framework is required.

Further advantages of the invention may be brought out in the following part of the specification wherein small details have been described for the competence of the disclosure, without intending to limit the scope of the invention which is set forth in the appended claims.

BEST MODE FOR CARRYING OUT THE INVENTION

Resins Used In The Invention

Any polyester resin that can be used to produce a polyurethane is satisfactory. The polyester resin has a hydroxyl number in the range of 350 to 600, preferably in the range of 400 to 500. It should have a molecular weight in the range of 500 to 1500. These polyesters are unsaturated, capable of reacting with isocyanate compounds, and are preferably linearly formed polyester polymers made from a polyalcohol and a polyacid by reacting them with either or both the polyalcohol and the polyacid being unsaturated.

The following polyalcohols, polyacids, and polyesters are examples of compounds usable in the preparation of polyester polymers in the invention. The alcohols are polyhydric, ethylene glycol, propylene glycol, butylene glycol, pentylene glycol, 2,5-dimethyl-3-hexane-2,5-diol, 3,6-dimethyl-4-octane-3,6-diol, 2-butene-1,4-diol, and mixtures thereof.

The polyacids include polycarboxylic acids, phthalic acid, maleic acid, fumaric acid, succinic acid, adipic acid, and mixtures thereof.

Unsaturated polyesters capable of reacting with isocyanate compounds include the ethylenically unsaturated polyesters, polyethylene glycol maleate, polyethylene glycol fumarate, polypropylene glycol maleate, polypropylene glycol fumarate, diathylene glycol fumarate maleate, polypropylene glycol maleate, polypropylene glycol maleate phthalate, and polypropylene glycol fumerate phthalate, and mixtures thereof. These and other unsaturated polymerizable polyester polymers which can be used in carrying out the present invention can be prepared by the method disclosed in U.S. Pat. No. 2,510,603.

A preferred polyester resin for use in our invention is sold under the trademark, Pleogen 4050, by Mol-Rez Division of American Petrochemical Co. and has the following characteristics:

| Acid No. | Hydroxyl No. | Viscosity | Water Content |
|---|---|---|---|
| 15–20 | 465–495 | 70,000–80,000 cp. | 0.1%–0.4% |

Polyester Resin And Isocyanates

It is important that the polyester resin be combined with the proper isocyanate compound in order that the resulting mixture or system have the capability of being partially cured, that is, B-staged. A particular polyester resin, as well as polyether resin, when reacted with one isocyanate compound may produce a B-stageable resin but when reacted with another isocyanate, may not produce a mixture or system that can be B-staged. For example, Pleogen 4050 reacted with polymethylene-polyphenyl isocyanate produces a thermosetting resin mixture that can be B-staged. However, Pleogen 4050 reacted with Pleogen 4012 produces a thermosetting resin mixture which cannot be B-staged. Pleogen 4012 is the trademark of a modified toluene di-isocyanate having an amine eqivalent of 123 to 128, a viscosity at 77 degrees F. of 350 to 430 cp.

Polyethers

Polyethers for forming polyurethanes can be formed by direct polymerization of oxides of normally gaseous aliphatic hydrocarbons, such as ethylene oxide and propylene oxide; by condensation of oxides of normally gaseous aliphatic hydrocarbons with aliphatic polyalcohol having from 3 to 8 carbon atoms in the molecule and from 2 to 5 hydroxyl groups; by sequential addition of polypropylene and ethylene oxides to ethylenediamine yielding products which vary widely in molecular weight; by adding propylene oxide to the two hydroxyl groups of a propylene glycol nucleus and adding ethylene oxide to both ends of this base; and by condensation of said oxides with other starting compounds having active hydrogen, such as phenol and resorcinol.

Polyether resins having hydroxyl numbers in the range of 350 to 600 are preferred. The following polyethers are set forth for use in the present invention.

(1) A reactive polyglycol product of Union Carbide Chemical Company, sold under the trademark, NIAX Triol LK-380, and having the following characteristics:

| | |
|---|---|
| Molecular weight | 440 |
| Specific Gravity 20/20° C. | 1.114 |
| Hydroxyl number, mg. KOH/g. | 370–390 |
| Volatility, % by wt., max. | 0.2 |
| Acid number, mg. KOH/g., sample max. | 0.2 |
| pH at 25° C. in 10:1 methanol - water (10:6 isopropanol - water) | 3.5–5.5 |
| Total unsaturation, meq. per g., max. | 0.04 |
| Potassium, p.p.m., max. | 10 |
| Water, % by wt., at time of shipment | 0.10 |
| Ash, % by wt., max. | 0.005 |
| Color platinum, max. | 100 |
| Suspended matter | Substantially free |

(2) A reactive polyglycol product of the same company, sold under the trademark, NIAX Pentol LA-700, and having the following characteristics:

| | |
|---|---|
| Molecular weight | 393 |
| Hydroxyl number, mg. KOH/g. | 665–735 |
| Volatility, % by wt., max. | 0.2 |
| Water, % by wt. at time of shipment | 0.05 |
| Ash, % by wt., max. | 0.005 |

(3) A reactive polyglycol product of the same company, sold under the trademark, NIAX Polyal LS-485, and having the following characteristics:

| | |
|---|---|
| Molecular weight | 673–731 |
| Hydroxyl number, mg. KOH/g. | 460–500 |
| Volatility, % by wt., max. | 0.3 |
| Acid number, mg. KOH/g. sample, max. | 0.2 |
| Total unsaturation, meq. per g., max. | 0.01 |
| Water, % by wt. at time of shipment | 0.1 |

(4) A reactive polyglycol product of Dow Chemical Company, sold under the trademark, Voranol RN-600, and having the following characteristics:

| | |
|---|---|
| OH number | 580–610 |
| OH equivalent weight | 97–92 |
| Viscosity, in centipoise, 77° F. (Av.) | 16,000 |
| Viscosity, in centipoise, 210° F. (range) | 60–70 |

(5) A polyether product of Wyandotte Chemical Company, sold under the trademark, Pluracol PeP 550, which is a tetrol having four secondary hydroxyl groups, each joined to a central carbon atom by an oxyalkylene chain, and having the following characteristics:

| | |
|---|---|
| OH number | 448 |
| Molecular weight | 500 |
| Water, % by wt., at time of shipment | 0.1 max. |
| Apparent pH, 10 g. in 60 cc of 10:1 methanol-water | 7.0 |
| Volatiles, % | 0.1 |
| Acid number | 0.04 |
| Unsaturation, % | 0.003 |
| Na + K, ppm | 50 |
| APHA color | 50 |
| Viscosity at 77 degrees F., centipoises | 820 |

(6) A polyether product of Wyandotte Chemicals Company, sold under the trademark, TRIOL TP 440, which is a triol having the structure

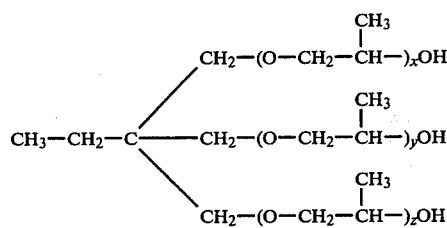

The values of x, y, and z are approximately equal, and have the following characteristics:

| | |
|---|---|
| OH number | 404 |
| Molecular weight | 418 |
| Apparent pH, 10 g. in 60 cc of 10:1 methenol-water | 7.0 |
| Water, % | 0.1 |
| Unsaturation, meq/g | 0.005 |
| Volatiles, % by wt. | 0.2 |
| Potassium + sodium 1 ppm. | <70 |
| Acid number | 0.03 |
| Viscosity at 77 degrees F. Centipoises | 625 |

Isocyanates For Reaction With Polyester Or Polyether Resin To Form Polyurethane

Isocyanates are reacted with a polyester or polyether resin to form a polyurethane which is then foamed according to the invention. Isocyanates which have been used have at least two —NCO groups and are capable of reacting with the polyester or polyether, and with water as a foaming agent, to form carbon dioxide gas to cause the foaming of the polyurethane. More specifically, we have employed a polymethylene polyphenylisocyanate, diphenylmethane-4,4'-diisocyanate, 1,5 naphthalene diisocyanate, triphenylmethane triisocyanate, diphenyl-4,6,4'-triisocyanate, 1,6-hexamethylene diisocyanate, 1,4 cyclohexylene diisocyanate, and mixtures thereof. With certain relatively slow curing polyester and polyether formulations, we have found that 2,4-toluene diisocyanate, 2,6-toluene diisocyanate, and mixtures of these toluene diisocyanates, wherein the 2,4 toluene diisocyanate is in a major amount, for example, 65-35, 70-30, and 80-20, respectively, can be used.

In the practice of the invention the polyester or polyether, water and isocyanate can be mixed together, followed by concurrent polymerization to the polyurethane and foaming to the foamed product, or if desired, a prepolymer can be produced of the polyether or polyester, and the isocyanate in molar excess. In the latter instance when the prepolymer procedure is used, the polyamide and water are added to activate and to provide for production of carbon dioxide for foaming.

Another cyanate compound for use in the invention is Voranate R-1, a toluene diisocyanate compound having 26.5 to 27.5 excess isocyanate and a viscosity of 10,000 centipoises at 77 degrees F., (average) and in the range of 20 to 30 at 210 degrees F., and is a product of Dow Chemical Company.

Blowing Agents For Polyurethane

Water is an important agent in a preferred polyurethane embodiment to produce a foam product of our invention, and it may be added to the mixture of the polyether or polyester, prior to the addition of the isocyanate. Other compounds which react like water, containing reactive hydrogen can be used to form carbon dioxide gas, including for example, low aliphatic alcohols such as methanol and glycerin, carboxylic acids such as formic and acetic acid, primary and secondary amines, and the sulfur analogs of the above alcohols, for example, methane thiol.

Volatile blowing agents are used if it is desired to produce a relatively low density foam in the neighborhood of 1.25 to 3.5 lbs. per cubic foot. Volatile blowing agents such as ligroine are preferred and they have the advantage as acting as heat sinks during the reactions to produce the foamed polymer. If volatile blowing agents are used, it may be necessary to force foam, that is, to heat the foamable mixture to an elevated temperature sufficient to vaporize the volatile blowing agent for a short interval in order to initiate the foaming action.

Polyamide Activator

When polyurethanes are used, polyamides can be utilized with the polyether or polyester, isocyanate, and water, the polyamide being an activator. An advantage of using the activator is that it can be used to reduce the surface tension of the foaming mixture and thereby control the cell size of the foam, the cell size being microscopic. The polyamides used are those formed from reacting polybasic organic acids and a polyamine in an amount in the range of 0.5 to 2 parts by weight per 100 parts by weight of the polyether or polyester resin. We have employed a polyamide condensation product of a polybasic organic acid and a polyamine containing amide groups, having molecular weight in the range of 1,000 to 10,000 and a melting point of from 25–90 degrees C. The polyamides that we have used are those sold under the trademark VERSAMID, produced by the Chemical Division of the General Mills Corporation, Kankakee, Ill. Products bearing this trademark are produced in accordance with the process taught in U.S. Pat. No. 2,379,413. Any polyamide VERSAMID can be employed, including VERSAMID 100, VERSAMID 115, VERSAMID 125, and VERSAMID 140, 115 and 125 being preferred. Some of the VERSAMID products are solids at room temperatures, and if solids are used, it is preferable to employ them at elevated temperatures above their melting points, or dissolved in an inert solvent common in the art. VERSAMID 115 is a polymer, fluid at room temperatures, and formed from reacting linoleic acid with a polyamine, having an amine value of 210 to 230 and a No. 6 Spindle viscosity of 500 to 750 at 4 RPM and 40 degrees C. VERSAMID 125 is a polymer which is fluid at room temperatures, formed from the condensation of polymetized linoleic acid with a polyamine, and having an amine value of 290 to 320, and a No. 6 Spindle viscosity of 80 to 120 at 4 RPM and 40 degrees C. VERSAMID 100 is a semisolid, having a melting point of approximately 43–53 degrees C. and VERSAMID 140 is one of the fluid series and is less viscous than the VERSAMID 125.

Polyepoxides

Rigid foaming polyepoxides used in our invention are saturated or unsaturated, aliphatic, cycloaliphatic, aromatic or heterocyclic. They can be used substituents, for example chlorine atoms, hydroxyl groups, ether groups, and the like. Also, the epoxides can be polymeric or monomeric. For ease and clarity, many of the polyepoxides applicable to our invention, particularly polymeric polyepoxides are described in terms of an epoxy equivalent value, the meaning of epoxide equivalent value being set forth in U.S. Pat. No. 2,633,458.

In regard to the epoxy equivalent value of a polyepoxide, when the polyepoxide consists of a single compound, and all of the epoxy groups, namely

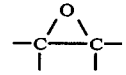

are intact, the epoxy equivalency of these compounds is designated by integers, for example, 2, 3, 4, 5, etc. When the polyepoxide is polymeric, many of the polymers can contain some of the monomeric monoepoxides as such or they can have some of the epoxy groups hydrated or otherwise reacted, and/or they can contain macromolecules of different molecular weights so that the epoxy equivalent value can be low and of a fractional value. The polymeric polyepoxide materials can, for example, have epoxy equivalent values such as 1.5, 1.8, and 2.5.

Monomeric Polyepoxides

Monomeric polyepoxides, which can be used as primary resins and/or diluents of certain suitable aromatic resins in the practice of our invention, include epoxidized triglycerides such as epoxidized glycerol trioleate and epoxidized glycerol trilinoleate, the monoacetate of epoxidized glycerol trioleate, 1,3-bis(2,3-epoxypropoxy) benzene, 1,4-bis(2,3-epoxypropoxy)benzene, 4,4'-bis(2,3-epoxypropoxy)diphenyl ether, 1,4-bis(2,3-epoxypropoxy)cyclohexane, 1,8-bis(2,3-epoxypropoxy)octane, 4,4'-bis(2,hydroxy-3,4'-epoxybutoxy)diphenyl dimethyl-methane, 1,3-bis(4,5-epoxypentoxy)-5-chlorobenzene, 1,3-bis(2-hydroxy-3,4'-eposybutoxy)benzene, 1,4-bis(3,4-epoxybutoxy)2-chlorocyclohexane, 1,4-bis and (2-hydroxy-4,5-epoxypentoxy)benzene.

Polymeric Polyepoxides

A preferred type of polymeric polyepoxides used in our invention are the epoxy polyethers of polyhydric phenols, made by reacting a polyhydric phenol with a halogen containing epoxide or dihalohydrin in the presence of an alkaline medium. The polyhydric phenols that can be conveniently used to produce these polyepoxides include hydroquinone, resorcinol, catechol, methyl resorcinol, polynuclear phenols, such as 2,2-bis(4-hydroxy-phenol)-butane, 2,2-bis(4-hydrophenyl)-propane (bisphenol A), 4,4-dihydroxy-benzophenone, bis(4-hydroxyl-phenyl)ethane, 1,5-dihydroxynaphthalene, and 2,2-bis(4-hydroxy-phenyl)pentane. Epoxides containing halogens which can be used are for example, 3-chloro-1,2-epoxyoctane, 3-chloro-1, 2-epoxybutane, 3-bromo-1, epichlorohydrin, and 2-epoxyhexane.

Monomer epoxide products produced by this method from dihydric phenols and epichlorohydrin can be represented by the general formula

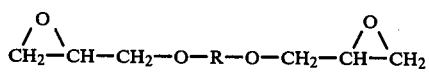

wherein R is a divalent hydrocarbon radical of the dihydric phenol. Polymeric products produced by this method will in general not be a single simple molecule but will be a rather complex mixture of glycidyl polyethers of the representative formula

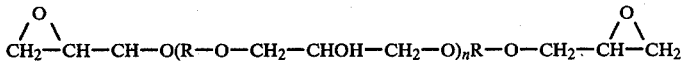

wherein R is a divalent hydrocarbon radical of the dihydric phenol and n is a number of the series 0, 1, 2, 3, 4, etc. For any single molecule of the polyether, n is an integer. However, since the resulting polyether is most generally a mixture of compounds, the value of n is an average which is not necessarily 0 or a whole number. Some resulting polyethers contain a very small amount of material wherein one or both of the terminal glycidyl radicals is in the form of a hydrate.

These preferred glycidyl polyethers of the dihydric phenols, described hereinbefore, can advantageously be prepared by reacting the required proportions of the dihydric phenol and the epichlorohydrin in an alkaline medium. Methods of preparing some specific glycidyl polyethers of dihydric phenols are set forth in U.S. Pat. No. 2,768,153.

Preferred members of the above-described group of polyepoxides for practicing our invention are those resulting from condensation of bisphenol A with epichlorohydrin, but many other bifunctional or multifunctional hydroxyl containing compounds (2 OH groups per molecule) with epichlorohydrin and other epihalo compounds give satisfactory polyepoxides. The polyepoxide resins resulting from condensation of bisphenol A and epichlorohydrin are particularly preferred, and are commercially available under the trademarks, Dow DER332, and Epon 828, 864, 1001, and 1007. Shell 1031 is a tetraglycidyl ether of 4,4,4,4-tetraphenolethane, and is a polyepoxide resin useful in this invention. A suitable polyepoxide resin can also be provided by mixing Dow DER332 with Epon 828, 864, 1001, and 1007 to achieve a suitable viscosity. DER322 is a product of the Dow Chemical Company of Midland, Mich. Epon 828, 864, 1001 and 1007 are products of the Hysol Corp., Olean, N.Y. These products were originally made by the Shell Chemical Company. They are copolymers of different molecular weight and Epon 828 has an epoxide equivalency of 175–210, and Dow DER332, one of 173–183. Epon 1001 is a solid with a high equivalency of 425–550.

Another class of polyepoxides that can be used in practicing our invention are the glycidyl ethers of novolac resins, such being obtained by the condensation of an aldehyde with a polyhydric phenol. Typical of this class of polyepoxides, and preferred, is the resin from formaldehyde 2,2-bis(5-hydroxy-phenol)propane novolac resin. A preferred resin is the one resulting from reaction of the reaction product of phenol and formaldehyde with an epoxylating agent such as epichlorohydrin. Polyepoxides Dow DEN438 and X2638.3 are preferred materials. They have epoxide equivalents of 177 and 188, and molecular weights of 485 and 610, respectively, for the copolymer.

Glycidyl Polyepoxides

Still another class of polyepoxides which are applicable to our invention are the glycidyl polyethers of a polyhydric phenol which as two hydroxy-aryl groups separated by an aliphatic chain of at least 6 carbon atoms in the chain and with the chain being attached by a carbon-to-carbon bond to a nuclear carbon atom of the hydroxyl aryl groups. Phenols which can be used for preparting these polyepoxide resins comprise those obtained by condensation of phenol with a phenol having an aliphatic side chain with one or more olefinic double bonds positioned in the chain so the required separating atoms are present between two hydroxyphenol groups of the resulting polyhydric phenol. Cardanol is a convenient source of phenols containing these side chains, and the cardanol is in turn obtained in a common and known manner from cashew nut shell liquid.

Polyepoxy Polyethers

Another class of preferred polyepoxides which can be utilized in practicing our invention comprises polyepoxy polyethers, obtained by reacting a halogen-containing epoxide, such as one of those set forth hereinbefore, with a polyhydric alcohol, with the reaction preferably in the presence of a compound which acts as an acid, such as hydrochloric or hydrofluoric acid. The resulting product is then preferably treated with an alkaline component. For the purpose of this disclosure and teaching "polyhydric alcohol" includes compounds having at least two free alcoholic OH groups, including the polyhydric alcohols and their ethers and esters, hydroxy-ketones, hydroxyaldehydes, and polyhydric alcohols which have been halogenated. Preferred polyhydric alcohols that can be used to produce the preferred diluents are ethylene glycol, diethylene glycol, propylene glycol, butylene glycol, glycerol, hexanetriol, sorbitol, mannitol, pentaerythritol, polyvinyl alcohol, polyallyl alcohol, inositol, trimethylolpropane, dimethylolmethane, bis(4-hydroxycyclohexyl), and the like. Preferably polyhydric ether alcohols include, among others, diglycerol, triglycerol, dipentaerythritol, tripentaerythritol, and the beta-hydroxyethyl ethers of polyhydric alcohols. Preferred and typical hydroxyaldehydes and ketones utilizable are dextrose, maltose, fructose, and glyceraldehyde. Mercapto (thiol) alcohols which can advantageously be employed are, for example, alpha-monothioglycerol, and alpha, alpha-dithioglycerol. Examples of polyhydric alcohol ethers which can be used are the monoglycerides, such as monostearin, monoesters of pentaerythritol and acids, such as acetic acid, butyric acid and pentanoic acid. The halogenated polyhydric alcohols can be such as the monochloride of sorbitol, the monochloride of pentaerythritol, the monochloride of glycerol and the monochloride of mannitol.

Glycidyl Polyethers

Methods to prepare the glycidyl polyethers of polyhydric alcohols are set forth in detail in U.S. Pat. No. 2,768,153, and especially preferred polyepoxides of this class are the glycidyl polyethers of aliphatic polyhydric alcohols containing from 2 to 10 carbon atoms and having from 2 to 6 hydroxyl groups, and more preferably the alkane polyols containing from 2 to 8 carbon atoms and having from 2 to 6 hydroxyl groups. These polyepoxides preferably have an epoxy equivalency greater than 1.0, more preferably an epoxy equivalency between 1.1 and 4 and with a molecular weight in the range of from 300 to 1000.

Epoxy Esters

Epoxy esters of polybasic acids are another class of polyepoxides which can be used in practicing our invention. Preferable epoxy esters of polybasic acids are such as diglycidyl phthalate, diglycidyl adipate, diglycidyl tetrahydrophthalate, diglycidyl maleate, epoxidized dimethallyl phthalate, and epoxidized dicrotyl phthalate.

Epoxy Monomers Ethylenic Linkage

Other suitable polyepoxides for the practice of our invention include the polymers and copolymers of the epoxy-containing monomers having at least one ethylenic linkage which is polymerizable, for example, the monomer allyl glycidyl ether. When this monomer and others like it are polymerized without alkaline or acetic catalysts, for example, polymerization in the presence of light, heat, oxygen, peroxy compounds, additional polymerization at the multiple bonds occurs, leaving the epoxy group unaffected. These epoxy group-containing monomers can be polymerized alone or with other ethylenically unsaturated monomers, for example, vinyl chloride, vinylidene chloride, vinylacetate, styrene acrylonitrile, methacrylonitrile, methyl methacrylate, methyl acrylate, diallyl phthalate, vinyl allyl phthalate, divinyl adipate, chlorallyl acetate, and vinyl methallyl pimelate.

Methods of preparing preferred polymeric polyepoxides are set forth in U.S. Pat. No. 2,768,153, and particularly preferred members of this class of polyepoxides are the polymers and copolymers of the 2-alkenyl glycidyl ethers having a molecular weight in the range of from 300 to 1000 and with an epoxy equivalency greater than 1.0, preferably an equivalency in the range of from 1.2 to 6.0.

We have found that epoxidized Buterez is a very suitable polymeric polyepoxide to use in the practice of our invention, such being the reaction product of peracetic acid with polybutadiene. Buterez is the trademark of Phillips Petroleum Company of Bartlesville, Okla. Per organic acids and olefinic compounds can be reacted to produce suitable polyepoxides.

Polyepoxides Modified With A Polyamide Curing Agent

It is particularly preferable in the practice of our invention that the polyepoxides be modified, that is, the polyepoxide resin is reacted with a small amount of a curing agent less than the amount necessary to harden and cure the resin prior to foaming and mixing with a hardening and curing agent. More preferably the polyepoxide is modified with a polyamide hardening and curing agent produced by condensing a polybasic carboxylic acid having from 1 to 26 carbon atoms in the molecule with a polyamine formed from a polymerizable amine having from 2 to 26 carbon atoms in the molecule, in an amount from 0.2 to 2 parts by weight, most preferably 1 part by weight, per 100 parts by weight of the polyepoxide resin. A preferred polyamine curing and hardening agent is sold under the trademark "Versamid 125", having an amine of 290–320 produced by the condensation of polymerized linoleic acid with a polyamine.

Curing Agents

In the practice of our invention any suitable curing agent for curing the selected epoxy resin material can be used that will, in combination with the selected resin, produce a partially curable, or B-stageable resin mixture.

In the practice of our invention, when a polyepoxide resin is selected, it can be cured with any suitable epoxy curing and hardening material. Typical examples of curing agents of the primary and secondary polyamines and their adducts are metaphenylenediamine, methylene dianiline, dimethyl aminomethylphenyl, tri(dimethylamino-methyl) phenyl, diethylene triamine, triethylene tetramine, tetraethylene pentamine, amino ethyl piperazine, and aliphatic amines having 2 to 20 carbon atoms in the molecule. The curing agent for the resin material can be various combinations of the aforementioned curing agents. Typical polyamine curing and hardening agents suitable for use in the practice of our invention are polyamide condensation products of carboxylic acid and a polyamine, and various other polyamide curing agents sold under the trademarks, D.E.H. (Dow Epoxy Hardener) 10, D.E.H. 11, D.E.H. 12, D.E.H. 14, by Dow Chemical Company. Typical curing and hardening agents that provide a change in reaction speed or cause a reaction are benzyldimethylamine, $BF_3$ monoethylamine, dicyandiamide, dimethyl amino methyl phenol, and alpha methylbenzyl dimethylamine. Various combinations of members of these classes can be used if desired.

Typical suitable anhydride curing agents are nadic anhydrides, pyromellitic dianhydride, chlorendic anhydrides, phthalic anhydrides, hexahydrophthalic anhydride, dodecenyl succinic anhydride, alkendic anhydride, and mixtures thereof.

The preferred polyepoxide curing and hardening agents for use in our invention are the amine curing and hardening agents, in an amount sufficient to harden and cure said resin, more preferably a mixture of triethylenetetramine and 4,4' diamino diphenyl methane, in an amount in the range of 15 to 35 parts by weight, most preferably 27 parts by weight, per 100 parts by weight of the polyepoxide resin of the bisphenol-A type of the epoxide equivalent weight of 170–220. Said aforementioned amine curing and hardening agents most preferably being used in the ratio of 1 part triethylene tetramine by weight to 10 parts by weight of an impure mixture of amines which is comprised of 70 percent 4,4' diamino diphenyl methane sold under the trademark "Tonox". Tonox is a trademark of the Naugatuck Chemical Division of U.S. Rubber Company, Naugatuck, Conn.

Blowing Agent

Polyepoxide blowing agents should be chemically decomposable at relatively low temperatures to produce a gas to foam the B-stagable resin mixture. In some instances it is necessary to force foam by heating the resin containing the blowing agent. However, blowing agents which react with the hardener and/or the resin at room temperature, or below, to produce a gas for foaming can also be employed. The amount of blowing agent used depends upon the type of agent, the degree of foaming desired, the density of the foam product, the type of heating, and other variables. Examples of blowing agents used in the process of the invention with polyepoxides are Celogen, Unicel, N,N' dinitrosopentamethylenetetramine, diazoaminobenzene(1,3 diphenyltriazene), azo-dicarbonamide(1,1' azobis-formamide) 2,2'azo-isobutyronitrile, azo-hexahydrobenzo nitrile, benzene sulfonylhydrazide, P-tert-butylbenzoylazide, and mixtures thereof.

A preferred blowing agent for use in producing a rigid open-cell polyepoxide resin foam material is a dispersion of 1 part by weight of Nitrosan BL-353, to 3 parts by weight of polyepoxide resin in an amount in the range of 10 to 30 parts by weight, more preferably an amount in the range of 20 to 25 parts by weight, and most preferably in an amount of 25 parts by weight, per 100 parts by weight of the polyepoxide resin. Nitrosan BL-353 is a trademark which identifies a mixture of 70 percent N,N' dimethyl N,N' dinitroso terephthalamide and 30 percent white mineral oil by weight produced by E. I. duPont de Nemours of Wilmington, Del. The polyepoxide resin that is preferably used in the aforementioned dispersion is Epon 828 produced by Hysol Corp., referred to above.

Another preferred blowing agent is Nitropore ATA. Nitropore ATA is easily activated by common plastic and rubber additives to cover a wide range of processing temperatures. The decomposition temperature of Nitropore ATA is easily controlled by the presence of metallic salts, glycols, and organic acids or bases.

| PRODUCT DESCRIPTION OF NITROPORE ATA | |
|---|---|
| Specific Gravity 25/25° C.: | 1.57 |
| Decomposition in Air: | 190–200° C. |
| w/Actafoam R-3: | 150–170° C. |
| w/RIA-CS: | 121–150° C. |
| w/Zinc Oxide: | 170–180° C. |
| w/Litharge: | 160–170° C. |
| Gas Yield ml. (STP/gm.): | 210 Minimum |
| Moisture Content | 1% Maximum |
| Composition of Gas: | $N_2$, $CO_2$, and trace $NH_3$ |
| Bulk Density | 22–26 lbs./cu. ft. |

Nitropore ATA was activated with RIA-CS with 10 parts of Nitropore to 1 part of RIA-CS. Nitropore and RIA are trademarks of Olin Chemicals, 120 Long Ridge Road, Stamford, Conn. 06904.

RIA-CS is a high grade, finely ground surface treated urea specifically designed as a basic cure accelerator and chemical blowing agent activator.

| PRODUCT DESCRIPTION OF RIA-CS | |
|---|---|
| Appearance | White crystalline, free blowing powder |
| Specific Gravity | 1.30 gm/cc |
| Melting Range | 125°–130° C. (254°–266° F.) |

Nitropore ATA as activated with RIA CS was used as a direct 1 to 1 substitution for Nitrosan.

Plasticizers

Any suitable thinning, plasticizing or processing agent can be used in the method of producing an open-cell foam of our invention if such use is necessary or desirable. Commercially available solvents have been found very advantageous for these ingredients, and typical examples of suitable solvents are toluene, xylene, carbon tetrachloride, ketones such as acetone, methyl ethyl ketone, methyl iso butyl ketone, cyclohexanone, ligroine, and mixtures thereof. A preferred solvent for use in foamable polyepoxide resin mixture in the process of our invention is ligroine of a density of 0.67 to 0.69 gms. per cc. at 20° C., in an amount in the range of 2 to 10 parts by weight, more preferably in the amount of 8 parts by weight per 100 parts of the resin.

Any other suitable plasticizer compound can, if desired be embodied in the rigid foam of the invention, and used in the process of making it. Another plasticizing agent for use in the polyepoxide embodiment of the invention is a mixture of polysulfide polymers produced by Thiokol Chemical Corporation and sold under the trademark of "LP-3 Thiokol" having an average chemical formula of

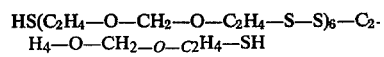

$$HS(C_2H_4-O-CH_2-O-C_2H_4-S-S)_6-C_2H_4-O-CH_2-O-C_2H_4-SH$$

with a viscosity of 700–1200 centipoises at 25° C. and an average molecular weight of approximately 1000. Unconverted LP-3 Thiokol is essentially a difunctional mercaptan made from 98 mole % of bis(2-chloroethyl) formal and 2 mole % of trichloropropane, a crosslinking agent. The polymer segments are composed of a number of formal groups liked by sulfur bonds and are terminated by mercaptan groups; side mercaptan groups occur occasionally in the chain of repeating formal units and some chain segments are crosslinked at various points. It is preferably used in an amount in the range of 2 to 15 parts by weight, more preferably 5 to 12 parts by weight, most preferably 10 parts by weight per 100 parts by weight of the polyepoxide resin. "LP-3 Thiokol" is produced by Thiokol Chemical Corporation, Trenton, N.J., and is a trademark for a polysulfide liquid polymer product.

Impregnating Fillers

Filler materials can be impregnated in the open-cell foams according to the invention to add strength, reduce solvent swell, reduce light effects, impart desirable electromagnetic wave influencing characteristics, and decrease cost. Examples of suitable filler materials for use in the process and composition of the invention are silica, carbon black, magnesia, titanium dioxide, aluminum powder, aluminum silicate, lead silicate, bentonites, clay, lithipone, asbestos, vermiculite, graphite, and mixtures thereof.

The filler materials impregnated in the open-celled rigid foam products of the invention are disposed within the cell cavities, as opposed to impregnated in the cell walls, as for example if the filler materials were put in the foamable mixture prior to foaming and curing. We have found that by disposing the filler materials in the cells it is possible to load substantially more filler into the foam than if it is embodied only in the cell walls. The open-celled rigid resin foam of our invention can be impregnated either before it is finally cured or after.

Most preferably, for purposes including the controlling of electromagnetic wave energy transmission, attenuation, and/or reflection properties of the foam composition, the filler material consists of a polynuclear aromatic substance comprising carbon black sold under the tradename of "Cabot xc-72r Black" produced by Cabot Corporation, 125 High Street, Boston, Mass., and calcium titanite. Ordinarily, the open cells of the foam product are impregnated with the maximum amount of filler material that is possible to place in the open cells. However, lesser amounts can be used. The ratio of the carbon black and calcium titanite can be varied to produce the desired characteristics of the impregnated foam material. Preferably the ratio of the calcium titanite to the carbon black is in the range of 1:1 to 1:3, most preferably in the ratio of 1:2.

Binders

A binder agent may be mixed with the filler material in order to secure the same in the cells of the foam material, although it is not always necessary. Thermosetting binders as varnishes and adhesives can be used. A preferable binding agent is a phenolic spar varnish used in an amount in the range of ½ to 2 parts by weight per 1 part by weight of the filler material. The spar varnish, carbon black and calcium titanite are mixed into a paste and then thinned with a solvent. Spar varnish is a phenolic novolac chemically combined with tung oil. The mixing can be accomplished in a three roll mix at room temperature. Any suitable solvent in a relatively small amount can be used to thin the paste produced from the binder and filler material, as for example, the commercial type solvent listed hereinbefore for use in mixing with the foamable resin mixture.

Carrier For Filler Mix

The resulting paste-like or varnish like filler mix is then dispersed in a suitable carrier prior to immersion of the crushed and reexpanded foam material therein to impregnate the foam with the filler material. We have found that the commercial solvent materials set forth above are satisfactory as carriers. The solvent selected must not be one that will dissolve or unduly soften the cell wall structure. Preferably 5 to 6 parts by weight of these solvents are used to each part by weight of the filler material and binder paste or varnish.

Specific Embodiment Of The Invention

A preferred embodiment of the new method of our invention of producing a deformation resisting, non-resilient, inflexible, rigid, thermosetting porous plastic cellular material having rigid macroscopic open cells is comprised of admixing the polymerizable thermosetting resin mixture and a foaming agent for the resin mixture in an amount sufficient to foam same. If desired, or necessary, solvents, plasticizers and fillers can be added to the mixture to achieve the desirable characteristics in the final product. After a mixture has been thoroughly mixed, it is B-staged at a relatively low temperature usually in the range of 70 degrees F. to 180 degrees F. for a time sufficient to foam and partially cure the mixture. This time can vary from 1 to 48 hours.

The resulting partially cured foam material is then softened by heating to an elevated temperature in the range of 150 degrees F. to 250 degrees F. for the time necessary for softening. After the material has been softened, and while it is still hot, the closed cells are ruptured in a press or roller apparatus. Ordinarily the foam material is crushed to approximately ½ its original expanded thickness. In the crushing the foam is compressed to a lesser thickness than the original in order to cause the walls forming the cells to rupture and thus produce an open-celled product. That is, the cells are retained but opened.

In some instances it has been found desirable to insulate the platen surfaces or rollers in order to prevent undue cooling of the foam material while it is being compressed.

In FIG. 1, there is shown a hydraulically operated press, generally designated as 10, for compressing a slab of partially cured foam 12 in which the closed cells are ruptured. The press has a lower platen 14, sidewalls 16 and 18, and a press plate 20, operated by two hydraulic rams 24 and 26. Stops 28 and 30 are positioned against the walls 16 and 18 to limit the downward movement of the press plate 20. The phantom line 32 indicates the height of the partially cured foam 12 above the plate 14 before compression. Insulation plates 34 and 36 are placed between the respective plates and the foam 12 to prevent undue cooling.

After the foam is partially cured and softened, it is positioned on the insulation 34 above the plate 14 and the press is moved downwardly so as to be stopped by the blocks 28 and 30 which are about half way between the original height at the line 32 and the upper surface of the platen 14. Thus, when the press is actuated to compress the foam, the foam is reduced to about one half its original expanded thickness.

After the cells have been ruptured, it is reexpanded by heating a temperature in a range of 150 degrees F. to 200 degrees F., the temperature being maintained in the range of 10 to 30 minutes. After the open-celled partially cured foam material is reexpanded it can be cured by heating temperatures in the range of 150 degrees F. to 250 degrees F. and a period of time in the range of 2 to 4 hours. In some instances, a final cure is not necessary.

The open-celled rigid foam material is impregnated by soaking in a dispersion of filler in a suitable liquid carrier. Usually a binding agent is used to secure the filler material in place in the foam cells. A preferred filler material is a combination of finely divided calcium titanite and carbon black in the ratio of 1 to 2, respectively. After the foam material has been soaked in the dispersion of the carrier and the filler, it is removed and dried, preferably in an oven. If the open-cell material had not been fully cured, it can be cured at this time.

The following examples are presented to illustrate the various features of the invention, and are not intended to be limiting:

EXAMPLE I

The resin material used was a modified polyepoxide produced by admixing 100 parts of Epon 828 with 1 part Versamid 125 and reacting the mixture. The reaction was accomplished by heating the mixture to 200 degrees F. and maintaining this temperature with continuous stirring for a period of one hour. The blowing agent was prepared before hand and consisted of a mixture of 1 part Nitrosan to 3 parts Epon 828 by weight. Preparation of the blowing agent was necessary because Nitrosan in the pure powder state decomposes in the presence of basic materials. Medium and strong bases in direct contact with Nitrosan can cause it to react violently. Therefore, precautions were taken to insure that amines, including triethylene tetramine, did not contact the powdered blowing material. Precautionary measures to avoid direct contact of Nitrosan and strong bases was not necessary after the Nitrosan was mixed with the Epon 828.

A foamable resin mixture was prepared by mixing 100 parts by weight of the modified polyepoxide with 8 parts by weight of ligroine, a plasticizer or solvent and blowing agent, 25 parts by weight of Tonox, a curing agent, 25 parts by weight of the blowing agent mixture of Nitrosan and Epon 828, 10 parts by weight of LP-3 Thiokol, a plasticizer, and finally 2.5 parts by weight triethylene tetramine, a curing agent. The above chemicals were mixed until the entire blend was uniform and it was then poured into a mold. The foam reacted slowly remaining in a liquid or semi-liquid condition for several hours at room temperature. The mold was not disturbed for twelve hours at which time the mixture entered into a gelled state.

After the mixture had gelled, it was forced foamed and cured using a stepwise cure consisting of heating the gelled product for four hours at 120 degrees F., followed by four hours at 150 degrees F., and finally one hour at 200 degrees F. for each inch of thickness. The foamed, partially cured, closed cell product was then removed from the oven and allowed to cool at room temperature. The foam blocks were then machined into slabs of appropriate thickness. These slabs were heated at 200 degrees F. until soft. The foam was considered ready for future operations when a finger could be pressed into the surface of the foam easily.

Immediately after the foam was softened, it was transferred to a press equipped with stops of the necessary thickness. Both sides of the foam slab were covered with sheet material in order to keep the surfaces of the foam from cooling. An insulating slab of foam was placed between the platen and the foam to be crushed in the press in order to avoid undue cooling of the exterior cells of the heated foam slab. The press was then closed with sufficient pressure to crush the closed foam to one-half of its original expanded thickness. This operation effectively opened or burst substantially all of the cells in the foam to produce an open-cell structure.

After the crushed foam slab was taken from the press, it was placed in an oven and preheated to 210 degrees F. to 215 degrees F. and heated until the slab had expanded to approximately its original thickness. The product was a partially cured open-celled rigid polyepoxide resin foam material having a density of five pounds per cubic foot.

EXAMPLE II

A slab of the open-celled rigid foam produced in Example I was impregnated with a filler material. A dispersion was prepared by admixing 100 parts by weight of spar varnish, and 10 parts by weight of calcium titanite. Spar varnish and calcium titanite were mixed until a well broken down paste was obtained, the mixing being accomplished on a three roll mix at room temperature. Twenty parts by weight of carbon black sold under the trademark of Cabot xc-72r black, was then added and mixed with the other two ingredients. Five to six volumes of toluene, a liquid carrier, were added and the resulting dispersion was thoroughly agitated. This filler solution was then transferred into a tray which was larger than the foam panel. The foam panel was then immersed in the filler dispersion and allowed to soak thoroughly. The foam slab was hung vertically to allow excess toluene to drip and/or evaporate. The foam slab was then placed in an explosion proof oven at 150 degrees F. At regular intervals the foam slab was removed from the oven and weighed, and this procedure was continued until three constant weighings of the impregnated foam were obtained. When the constant weighings were obtained, the product was examined and found to contain 62.5 parts by weight of filler to 100 parts by weight of the unfilled open-cell foam. Cross-sectional inspection of the foam slab showed uniform dispersion of the filler throughout.

EXAMPLE III

The same procedure as outlined in Example II was followed using a slab of open-celled foam produced in Example I, but the filler dispersion consisted of 100 parts of spar varnish, 60 parts Cabot xc-72r black, and 30 parts of calcium titanite. An inspection of the final product revealed that there was 85 parts by weight of the filler to 100 parts by weight of the unfilled foam.

EXAMPLE IV

Open celled foam slabs produced in Example I were impregnated in basically the same procedure outlined in Example II, except that the filler dispersion consisted of 100 parts of spar varnish, 120 parts by weight of Cabot xc-72r black, and 60 parts by weight calcium titanite. An analysis of the final product produced revealed that there were 135 parts by weight of the aforedescribed filler material to 100 parts by weight of the unfilled foam.

EXAMPLE V

The following ingredients were mixed together:

| | |
|---|---|
| Pleogen 4050 (polyester resin) | 100 parts by weight |
| Versamid 125 (polyamide activator) | 1 part by weight |
| water | 3½ parts by weight |
| polymethylene-polyphenylisocyanate | 165 parts by weight |

Each ingredient was mixed individually into the mix in the order shown above. The mixture was allowed to foam and gel at room temperature for 16 hours. The resulting product was a semi-rigid partially cured closed-cell foam. The closed cell foam product was heated for a short time to a temperature of 250 degrees to 300 degrees F. in order to soften same. Subsequently it was placed in a platen press which had been insulated in the manner described in Example I, and the press closed, crushing the foam slab to approximately one-half its original thickness. The crushed slab when removed from the press did not immediately regain its original expanded thickness. The slab was placed in an oven heated to 275 degrees F. for a period of thirty minutes where upon it expanded to its original thickness. After an examination, the slab was put back into the oven for the final cure. The slab remained in the oven at 275 degrees F. for one hour for each inch of thickness. The finally cured product was a rigid open-celled foamed product having a density of two pounds per cubic foot.

EXAMPLE VI

The following ingredients were mixed together:

| | |
|---|---|
| Pleogen 4050 | 100 parts by weight |
| Versamid 125 | 1 part by weight |
| water | ¼ part by weight |
| polymethylene-polyphenylisocyanate | 122 parts by weight |

Each ingredient was mixed individually into the mix in the order indicated above. The mix was foamed and treated in the same manner described in Example V. The finally cured product was a rigid open-celled foam having a density of ten pounds per cubic foot.

EXAMPLE VII

The following ingredients were mixed together:

| | |
|---|---|
| Pleogen 4050 | 100 parts by weight |
| Versamid 125 | 1 part by weight |
| water | ¾ part by weight |

| | |
|---|---|
| polymethylene-polyphenylisocyanate | 130 parts by weight |

The mixture was treated and cured in the same manner disclosed in Example V. The resulting product was a rigid open-celled foam having a density of six pounds per cubic foot.

EXAMPLE VIII

The following ingredients were mixed together:

| | |
|---|---|
| Epon 828 (epoxide equivalency 175–210) | 100 parts by weight |
| Versamid 125 | 1 part by weight |
| Thiokol LP-3 | 20 parts by weight |
| Dispersion of Nitrosan (BL-353) in Epon 828 in the ratio of 1 part by weight Nitrosan to 3 parts by weight of Epon 828 | 25 parts by weight |
| ligroine (D = 0.67–0.69) | 8 parts by weight |
| Tonox | 25.4 parts by weight |
| triethylene tetramine | 5 parts by weight |

Each ingredient was mixed into the mix in the manner disclosed in Example I. The product was foamed and treated in the same manner disclosed in Example II. The resultant cured product was an open-celled rigid foam product having relatively uniform size open cells.

EXAMPLE IX

A polyurethane foam from a polyether is prepared from the following:

| | |
|---|---|
| Voranol RN-600 (polyglycol) | 100 parts by weight |
| Versamid 125 | 1 part by weight |
| water | 2 parts by weight |
| Voranate R-1 (toluene diisocyanate) | 166 parts by weight |

The aforementioned ingredients are mixed until the entire blend is uniform, and it is then poured into a mold. The mixture is allowed to foam and gel for several hours at room temperature. The foam product is in the form of a slab. The slab is heated at 250 degrees F. until soft. The foam is considered ready for future operations when a finger can be pressed into the surface of the foam slab easily. Immediately after the foam is softened, it is transferred to a press provided with stops of the necessary thickness where the foam is crushed to approximately one-half its original thickness. Upon removing the crushed open cell foam slab from the press, it is placed in an oven preheated to 250 degrees F. to 300 degrees F. for 20 minutes until it expands to approximately its original thickness. The product is a partially cured, open cell rigid polyurethane resin foam material having a density of 3.5 pounds per cubic foot. The foam is uniform and of a high quality. The open cell resultant product is then impregnated with Cabot xc-72r carbon black and calcium titanite filler material in the same manner as set forth in Example II. A cross-sectional inspection of the foam slab shows a uniform dispersion of the filler throughout.

EXAMPLE X

A polyurethane foam formed from a polyether is produced from the following:

| | |
|---|---|
| NIAX Diol PPG-425 (polyglycol) | 100 parts |
| Versamid 125 | 3 parts |
| water | 2 parts |
| Voranate R-1 | 166 parts |

The aforementioned ingredients are mixed individually into the mix and the resultant mixture allowed to foam and gel at room temperature for 16 hours. The resulting product is a partially cured closed-cell foam in slab form. The closed-cell foam slab is then placed in a platen press which has been insulated in the manner described in Example I, and the press closed crushing the foam slab to approximately one-half its original thickness. The slab is then taken from the press and placed in an oven heated to 270 degrees F. for a period of 30 minutes whereupon it regains approximately its original thickness. The foam is then cured at 250 degrees F. one hour for each inch of cross section. The product is a cured open-cell rigid polyurethane foam.

EXAMPLE XI

The rigid open-cell polyurethane foam product produced in Example X is impregnated by soaking it in a dispersion of titanium dioxide in liquid hexane carrier as follows:

| | |
|---|---|
| Hexane | 100 parts by weight |
| Titantium dioxide powder | 10 parts by weight |
| Spar varnish | 20 parts by weight |

The titanium dioxide and spar varnish are mixed into a paste and the paste added to the hexane with agitation to form a dispersion. The foam is immersed in this dispersion four times, each time until thoroughly soaked. The excess carrier and dispersion is allowed to drip and/or evaporate therefrom between immersions. The resulting slab is dried in an explosion proof oven at 150 degrees F. The cells of the impregnated foam slab have titanium dioxide disposed therein uniformly thoughout the slab.

EXAMPLE XII

The resin material used was a modified polyepoxide produced by admixing 100 parts of Epon 828 with 1 part Versamid 125 and reacting the mixture. The reaction was accomplished by heating the mixture to 200 degrees F. and maintaining this temperature with continuous stirring for a period of one hour. Ten parts of a blowing agent, Nitropore ATA, a powder, were mixed with one part of RIA-CS, a powder activator, for blowing activation during the process.

A foamable resin mixture was prepared by mixing 100 parts by weight of the modified polyepoxide with 8 parts by weight of ligroine, a plasticizer or solvent and blowing agent, 25 parts by weight of Tonox, a curing agent, 25 parts by weight of the activated blowing agent Nitropore ATA, 10 parts by weight of LP-3 Thiokol, a plasticizer, and finally 2.5 parts by weight triethylene tetramine, a curing agent. The above chemicals were mixed until the entire blend was uniform and it was then poured into a mold. The foam reacted slowly remaining in a liquid or semi-liquid condition for several hours at room temperature. The mold was not disturbed for twelve hours at which time the mixture entered into a gelled state.

After the mixture had gelled, it was forced foamed and cured using a stepwise cure consisting of heating the gelled product for six hours at 120 degrees F., followed by two hours at 150 degrees F., and finally one hour at 200 degrees F. for each inch of thickness. The foamed, partially cured, closed cell product was then removed from the oven and allowed to cool at room temperature. The foam blocks were then machined into slabs of appropriate thickness. These slabs were heated at 290 degrees F. until soft. The foam was considered ready for further operations when a finger could be pressed into the surface of the foam easily.

Immediately after the foam was softened, it was transferred to a press equipped with stops of the necessary thickness. Both sides of the foam slab were covered with sheet material in order to keep the surfaces of the foam from cooling. An insulating slab of foam was placed between a platen and the foam to be crushed in the press in order to avoid undue cooling of the exterior cells of the heated foam slab. The press was then closed with sufficient pressure to crush the closed foam to one-half of its original expanded thickness. This operation effectively opened or burst substantially all of the cells in the foam to produce an open-cell structure.

After the crushed foam slab was taken from the press, it was placed in an oven and heated to 290 degrees F. until the slab had expanded to approximately its original thickness. The blowing agents acted in tandem at the lower and higher temperatures. The product was a partially cured open-celled rigid polyepoxide resin foam material having a density of five pounds per cubic foot.

The above foam was then impregnated substantially in accordance with Examples II, III and IV.

The invention and its attendant advantages will be understood from the foregoing description and will be apparent that various changes may be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. A method of producing a deformation resisting, non-resilient, inflexible, rigid, impregnable plastic thermosetting foam structure having open cells comprising:
   foaming and partially curing a foamable, curable resin mixture to a B-stage state of cure, the foam becoming rigid in the partial cure and having closed cells;
   softening the partially cured foam;
   compressing to crush the foam material to a thickness less than its original thickness in order to cause the walls forming the cells to rupture to produce an open-celled structure;
   reexpanding the compressed open cell foam material; and
   finally curing the open cell foam to be rigid and having inherent great structural strength.

2. The method according to claim 1 in which:
   the cells are macroscopic.

3. The method according to claim 1 in which:
   the foam during the reexpanding is expanded to its original size and thickness.

4. The method according to claim 1 including:
   impregnating the foam with a finally divided filler material after it is reexpanded and before it is finally cured.

5. A method according to claim 4 in which:
   the filler is selected from the group consisting of silica, carbon black, magnesia, titanium dioxide, aluminum powder, aluminum silicate, lead silicate, bentonites, clay, lithipone, asbestos, vermiculite, graphite, and mixtures thereof.

6. The method according to claim 1 including:
   impregnating the foam with a finally divided filler material to substantially fill the open cells by immersing the foam in a liquid dispersion of the filler material.

7. A method according to claim 6 in which:
   the filler is selected from the group consisting of silica, carbon black, magnesia, titanium dioxide, aluminum powder, aluminum silicate, lead silicate, bentonites, clay, lithipone, asbestos, vermiculite, graphite, and mixtures thereof.

8. The method according to claim 1 in which the foam is formed by:
   admixing a B-stageable polymerizable thermosetting resin selected from the group consisting of a curable polyepoxide resin, a polyurethane formed from a polyester resin and an isocyanate compound, a polyurethane formed from a polyether resin and an isocyanate compound, and mixtures thereof; and a foaming agent for said resin in an amount sufficient to foam the same;
   curing the resin to said B-staged state of partial cure by heating the mixture to temperatures in the range of 50 degrees F. to 180 degrees F.;
   maintaining said temperatures for a time sufficient to foam the mixture and achieve said partial cure to produce a closed-cell structure;
   said softening of the partially cured foam structure being accomplished by heating the same until it can be indented with a finger;
   after said crushing, reexpanding the structure by heating the same until the structure is expanded; and
   accomplishing said final cure by heating the foam material.

9. The method according to claim 1 or 8 in which:
   the foam structure is compressed to approximately one-half of its original thickness to produce an open-celled foam structure;
   the temperature for reexpanding the crushed foam is in the range of 150 degrees F. to 250 degrees F. and is maintained for a period in the range of 10 to 30 minutes.

10. The invention according to claim 9 in which:
    after final cure, impregnating the resultant open-celled structure by soaking the same in a dispersion of a finally divided filler material in a liquid carrier; and
    removing the soaked and impregnated product, and draining the excess dispersion, and drying.

11. The method according to claim 8 in which the polyurethane is formed from a polyether resin and an isocyanate compound by mixing:
    a polymerizable polyether resin having a hydroxyl number greater than 400 and selected from the group consisting of polyethers formed by direct polymerization of oxides of normally gaseous aliphatic hydrocarbons, condensation of oxides of normally gaseous aliphatic hydrocarbons with an aliphatic polyalcohol having from 3 to 8 carbons in the molecule and 2 to 5 hydroxyl groups, and mixtures thereof;

water; and an isocyanate having at least 2—NCO groups and copolymerizable with polyether and reactable with water to form carbon dioxide gas.

12. The method according to claim 8 in which the polyurethane is formed from a polyether resin and an isocyanate by admixing:

a polymerizable polyether resin having a hydroxyl number in the range of 580 to 610 and selected from the group consisting of polyethers formed by a direct polymerization of oxides of normally gaseous aliphatic hydrocarbons, condensation of oxides of normally gaseous aliphatic hydrocarbons with an aliphatic polyalcohol having from 3 to 8 carbon atoms in the molecule and 2 to 5 hydroxyl groups, and mixtures thereof;

a polyamide condensation product of polymerizable linoleic acid condensed with a polyamide having an amine value in the range of 290 to 320 in an amount in the range of 1 to 2 parts by weight;

water in an amount in the range of 1½ to 4 parts by weight; and toluene diisocyanate in an amount in the range of 160 to 170 parts by weight, each per 100 parts by weight of said polyether resin.

13. The method according to claim 8 in which the polyurethane is formed from a polyether resin and an isocyanate by admixing:

a polymerizable polyether resin having a hydroxyl number in the range of 580 to 610, a hydroxyl equivalent weight in the range of 97 to 92, and selected from the group consisting of polyethers formed by a direct polymerization of oxides of normally gaseous aliphatic hydrocarbons, condensation of oxides of normally gaseous aliphatic hydrocarbons with an aliphatic polyalcohol having from 3 to 8 carbon atoms in the molecule and 2 to 5 hydroxyl groups, and mixtures thereof;

a polyamide condensation product of polymerized linoleic acid condensed with a polyamide having an amine value in the range of 290 to 320 in an amount in the range of 1 to 2 parts by weight;

water in an amount in the range of 1½ to 4 parts by weight; and toluene diisocyanate in an amount in the range of 160 to 170 parts by weight, each per 100 parts by weight of said polyether resin.

14. The method according to claim 8 in which a polyurethane is formed from a polyester resin and an isocyanate by admixing:

a polymerizable polyester resin produced by condensing a polycarboxylic acid with a polyhydric alcohol, having a hydroxyl number in the range of from 350 to 500, and a molecular weight in the range of 500 to 1500;

water; and an organic isocyanate having at least 2—NCO groups and copolymerizable with said polyester and reactable with said water to form carbon dioxide.

15. The method according to claim 8 in which the polyurethane is formed from the polyester resin and isocyanate by admixing:

a polymerizable polyester resin produced by condensing a polycarboxylic acid with a polyhydric alcohol, having a hydroxyl number in the range of from 350 to 500, and a molecular weight in the range of 500 to 1500;

a polyamide condensation product of linoleic acid condensed with a polyamine having an amine value in the range of 290 to 320 in an amount in the range of from 0.5 to 2 parts by weight;

water in an amount in the range of 3 to 4 parts by weight; and polymethylene-polyphenylisocyanate in an amount in the range of from 160 to 170 parts by weight, each per 100 parts by weight of said polyester resin.

16. The method according to claim 15 in which the polyurethane foam is formed from a polyester resin:

the closed-cell foam structure is softened by heating at a temperature in the range of 250 degrees F. to 300 degrees F. for a period in the range of 10 to 20 minutes;

the closed-cells of the softened foam are crushed to be opened by compressing the foam to approximately one-half of its original thickness;

the partially cured open-celled foam is reexpanded to its original size by heating at a temperature in the range of 250 degrees F. to 300 degrees F. for an interval in the range of 10 to 30 minutes; and the foam is finally cured by heating at a temperature in the range of 250 degrees F. to 260 degrees F. for an interval of from 50 to 70 minutes per each inch of thickness of the foam.

17. The method according to claim 16 in which the finally cured product is impregnated with a filler by:

soaking the open-celled foam in a dispersion produced by mixing toluene, phenolic spar varnish in an amount in the range of 17 to 20 parts by weight of carbon black in an amount in the range of 3 to 4 parts by weight, and calcium titanite in an amount in the range of 1.5 to 2 parts by weight, each per 100 parts by weight of said toluene;

allowing the excess toluene to drain from the foamed product; and drying the resultant cured impregnated open-celled foam material by heating the same at a temperature in the range of 140 degrees F. to 160 degrees F. until dry.

18. The method according to claim 14 in which the polyurethane foam is made from a polyether resin:

the partially cured closed-cell foam structure is softened by heating to a temperature in the range of 250 degrees F. to 300 degrees F. for an interval in the range of 10 to 20 minutes;

the closed cells of the softened partially cured foam are crushed by compressing the foam to approximately one-half of its original thickness to open the cells;

the open-celled foam is reexpanded by heating at a temperature in the range of 250 degrees F. to 350 degrees F. for an interval in the range of 10 to 30 minutes to restore the foam to its original thickness;

soaking the open-cell foam to impregnate the same in a dispersion of a mixture of toluene, phenolic spar varnish in an amount in the range of 17 to 20 parts by weight, of carbon black in an amount in the range of 3 to 4 parts by weight, and calcium titanite in an amount in the range of 0.5 to 2 parts by weight, each per 100 parts by weight of said toluene, whereby the open cells of the foam are impregnated with the carbon black and titanite;

allowing the excess toluene to drain from the foam product; and drying the resultant cured impregnated open-celled polyurethane foam by heating the same at a temperature in the range of 140 degrees F. to 160 degrees F. until dry.

19. A method of producing a deformation resisting, non-resilient, inflexible, rigid impregnable plastic thermosetting foam structure having open cells comprising, admixing a modified polyepoxide produced by reacting a polyepoxide having a

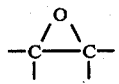

equivalency greater than one with a curing and hardening agent therefor, said curing and hardening agent being present in a relatively small amount and less than the amount sufficient to harden and cure the polyepoxide, a curing and hardening agent for epoxies in an amount sufficient to harden and completely cure the modified polyepoxide, and a decomposable blowing agent in an amount sufficient to foam the modified polyepoxide;

gelling the resultant mixture by maintaining the same at a temperature in the range of 45 degrees F. to 130 degrees F. for an interval in the range of 6 to 24 hours;

force foaming and partially curing the gelled product by heating to a temperature in the range of 90 degrees F. to 150 degrees F. to an interval in the range of 2 to 6 hours to form a closed-cell foam;

softening the foam by heating at a temperature in the range of 150 degrees F. to 250 degrees F.;

compressing and crushing the softened foam to open the cells; and reexpanding the crushed open-celled foam by heating to a temperature in the range of 150 degrees F. to 250 degrees F.

20. A method according to claim 19 including:

soaking the open-celled foam in a dispersion produced by mixing a liquid carrier, and a finally divided filler in an amount in the range of 3 to 20 parts by weight, per 100 parts by weight of the carrier, whereby the foam cells are impregnated with the filler;

removing the impregnated foam from the dispersion;

allowing excess liquid carrier to drain from the foam; and drying and curing the resultant impregnated open-celled foam by heating.

21. A method of producing a deformation resisting, non-resilient, inflexible, rigid plastic thermosetting foam structure having open cells comprising:

admixing a modified polyepoxide produced by reacting a polyepoxide having a

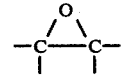

equivalency in the range of 175 to 210 produced by reacting bisphenol A and epichlorohydrin, a polyamide curing and hardening agent for polyepoxides produced by condensing a polybasic carboxylic acid having from 1 to 26 carbon atoms in the molecule with a polyamine formed from a polymerizable amine having from 2 to 26 carbon atoms in the molecule in an amount from 0.2 to 2 parts by weight per 100 parts by weight of said polyepoxide;

said reacting being carried on at a temperature in the range of 180 degrees F. to 220 degrees F. for a period of from ½ to 1½ hours;

ligroine in an amount in the range of 7 to 9 parts by weight;

4,4' diamino diphenyl methane in an amount in the range of 23 to 27 parts by weight;

a blowing agent mixture of a polyepoxide having a

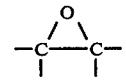

equivalency in the range of 175 to 210, and N,N' dimethyl N,N' dinitrosoterephthamide in an amount of 1 part by weight per 3 parts by weight of said polyepoxide, said blowing agent mixture being present in an amount in the range of 23 to 27 parts by weight;

a plasticizer comprising a liquid mixture of polysulfide polymers produced by condensing an alkaline polysulfide with a dihalide in an amount in the range of 9 to 11 parts by weight; and triethylene tetramine in an amount in the range of 2 to 3 parts by weight, each per 100 parts by weight of modified polyepoxide;

gelled the resulting mixture in a mold by maintaining the same at a temperature in the range of 50 degrees F. to 90 degrees F. for a period in the range of 8 to 16 hours;

force foaming and partially curing the resultant gelled product by heating the same to a temperature in the range of 110 degrees F. to 130 degrees F. for an interval in the range of 3 to 5 hours;

heating the mixture at a temperature in the range of 140 degrees F. to 160 degrees F. for an interval in the range of 3 to 5 hours; and subsequently heating the mixture to a temperature in the range of 190 degrees F. to 210 degrees F. for a period in the range of 50 to 70 minutes for each inch of thickness of the resulting closed-cell product;

softening the product to a temperature in the range of 195 degrees F. to 205 degrees F.;

compressing the closed-cell product to approximately one-half the original expanded thickness to cause the walls forming the closed cells to rupture to produce an open-celled product;

reexpanding the open-celled foam material by heating to a temperature in the range of 210 degrees F. to 215 degrees F. and maintaining the temperature for an interval in the range of 10 to 30 minutes.

22. A method according to claim 21 including:

soaking the open-celled foam in a dispersion produced by mixing toluene, phenolic spar varnish in an amount in the range of 17 to 20 parts by weight, carbon black in an amount in the range of 3 to 4 parts by weight, and calcium titanite an amount in the range of 1.5 to 2 parts by weight, each per 100 parts by weight of said toluene, whereby the foam is impregnated with carbon black and calcium titanite;

removing the resulting open-celled foam product from the dispersion;

allowing excess toluene to drain from the foam product; and drying and curing the resultant impregnated open-celled foam by heating at a temperature in the range of 140 degrees F. to 160 degrees F. until dried.

23. A method according to claim 21 including:

finally curing the reexpanded foam by heating to a temperature in the range of 240 degrees F. to 270 degrees F. for a period of from 50 to 70 minutes per inch of thickness of the product.

24. A method according to claim 23 including impregnating the finally cured open-celled foam:

soaking the open-celled foam in a dispersion produced by mixing toluene, phenolic spar varnish in an amount in the range of 17 to 20 parts by weight, carbon black in an amount in the range of 3 to 4 parts by weight, and calcium titanite in an amount in the range of 1.5 to 2 parts by weight, each per 100 parts by weight of said toluene;

allowing the excess toluene to dry from the foam product; and drying the resultant cured impregnated open-celled foam material by heating at a temperature in the range of 140 degrees F. to 160 degrees F. until dry.

25. A rigid porous, deformation resisting, non-resilient inflexible, thermoset resin foam having macroscopic open cells formed by:

admixing a B-stagable polymerizable thermosetting resin mixture selected from the group consisting of a curable polyepoxide resin, a polyurethane formed from a polyester resin and an isocynate compound, a polyurethane formed from a polyether resin and an isocynate compound, and mixtures thereof, and a forming agent for the resin mixture in an amount sufficient to foam the same;

B-staging the resulting curable mixture by heating to a temperature in the range of 50 degrees F. to 180 degrees F. and maintaining the temperature for a time sufficient to foam the mixture and partially cure the same to produce a partially cured closed-cell foam material;

softening the resulting partially cured foam material by heating until it can be indented with a finger;

compressing and crushing the softened closed-cell foam to approximately one-half its original thickness to cause the walls forming the cells to rupture to produce an open-celled foam;

reexpanding the opened-celled foam by heating until the structure is expanded.

26. A rigid foam according to claim 25 in which:

the open-celled foam by is finally cured by heating to a temperature in the range of 150 degress F. to 250 degrees F. and maintaining the temperature for the necessary length of time to achieve a final cure.

27. A rigid foam according to claim 25 in which the foam is impregnated by:

soaking the same in a dispersion of a filler material in a liquid carrier;

removing the soaked and impregnated product;

draining the excess dispersion; and drying.

28. A rigid form according to claim 27 in which:

the filler is selected from the group consisting of silica, carbon black, magnesia, titanium dioxide, aluminum powder, aluminum silicate, lead silicate, bentonites, clay, lithipone, asbestos, vermiculite, graphite, and mixtures thereof.

29. A rigid foam according to claim 27 in which:

the impregnated open-celled foam is finally cured by heating to a temperature in the range of 150 degrees F. to 250 degrees F. and maintaining the temperature for the necessary length of time to achieve a final cure.

30. A rigid foam according to claim 25 in which polyurethane is formed from a polyether resin and an isocyanate compound by mixing:

a polymerizable polyether resin having a hydroxyl number greater than 400 and selected from the group consisting of polyethers formed by direct polymerization of oxides of normally gaseous aliphatic hydrocarbons, condensation of oxides of normally gaseous aliphatic hydrocarbons with an aliphatic polyalcohol having from 3 to 8 carbons in the molecule and 2 to 5 hydroxyl groups, and mixtures thereof;

water; and an isocyanate having at least 2—NCO groups and copolymerizable with polyether and reactable with water to form carbon dioxide gas.

31. A rigid foam according to claim 25 in which the polyurethane is formed from a polyether resin and an isocyanate by admixing:

a polymerizable polyether resin having a hydroxyl number in the range of 580 to 610 and selected from the group consisting of polyethers formed by a direct polymerization of oxides of normally gaseous aliphatic hydrocarbons, condensation of oxides of normally gaseous aliphatic hydrocarbons with an aliphatic polyalcohol having from 3 to 8 carbon atoms in the molecule and 2 to 5 hydroxyl groups, and mixtures thereof;

a polyamide condensation product of polymerizable linoleic acid condensed with a polyamide having an amine value in the range of 290 to 320 in an amount in the range of 1 to 2 parts by weight;

water in an amount in the range of 1½ to 4 parts by weight; and toluene diisocyanate in an amount in the range of 160 to 170 parts by weight, each per 100 parts by weight of said polyether resin.

32. A rigid foam according to claim 25 in which the polyurethane is formd from a polyether resin and an isocyanate by admixing:

a polymerizable polyether resin having a hydroxyl number in the range of 580 to 610, a hydroxyl equivalent weight in the range of 97 to 92, and selected from the group consisting of polyethers formed by a direct polymerization of oxides of normally gaseous aliphatic hydrocarbons, condensation of oxides of normally gaseous aliphatic hydrocarbons with an aliphatic polyalcohol having from 3 to 8 carbon atoms in the molecule and 2 to 5 hydroxyl groups, and mixtures thereof;

a polyamide condensation product of polymerized linoleic acid condensed with a polyamide having an amine value in the range of 290 to 320 in an amount in the range of 1 to 2 parts by weight;

water in an amount in the range of 1½ to 4 parts by weight; and toluene diisocyanate in an amount in the range of 160 to 170 parts by weight, each per 100 parts by weight of said polyether resin.

33. A rigid foam according to claim 25 in which a polyurethane is formed from a polyester resin and an isocyanate by admixing:
  a polymerizable polyester resin produced by condensing a polycarboxylic acid with a polyhydric alcohol, having a hydroxyl number in the range of from 350 to 500, and a molecular weight in the range of 500 to 1500;
  water; and
  an organic isocyanate having at least 2—NCO groups and copolymerizable with said polyester and reactable with said water to form carbon dioxide.

34. A rigid foam according to claim 25 in which the polyurethane is formed from the polyester resin and isocyanate by admixing:
  a polymerizable polyester resin produced by condensing a polycarboxylic acid with a polyhydric alcohol, having a hydroxyl number in the range of from 350 to 500, and a molecular weight in the range of 500 to 1500;
  a polyamide condensation product of linoleic acid condensed with a polyamine having an amine value in the range of 290 to 320 in an amount in the range of from 0.5 to 2 parts by weight;
  water in an amount in the range of 3 to 4 parts by weight; and
  polymethylene-polyphenylisocyanate in an amount in the range of from 160 to 170 parts by weight, each per 100 parts by weight of said polyester resin.

35. A rigid foam according to claim 34 in which the polyurethane foam is formed from a polyester resin:
  the closed-cell foam structure is softened by heating at a temperature in the range of 250 degrees F. to 300 degrees F. for a period in the range of 10 to 20 minutes;
  the partially cured open-celled foam is reexpanded to its original size by heating at a temperature in the range of 250 degrees F. to 300 degrees F. for an interval in the range of 10 to 30 minutes; and
  the foam is finally cured by heating at a temperature in the range of 250 degrees F. to 260 degrees F. for an interval of from 50 to 70 minutes per each inch of thickness of the foam.

36. A rigid foam according to claim 35 in which the finally cured product is impregnated with a filler by:
  soaking the open-celled foam in a dispersion produced by mixing toluene, phenolic spar varnish in an amount in the range of 17 to 20 parts by weight of carbon black in an amount in the range of 3 to 4 parts by weight, and calcium titanite in an amount in the range of 1.5 to 2 parts by weight, each per 100 parts by weight of said toluene;
  allowing the excess toluene to drain from the foamed product; and
  drying the resultant cured impregnated open-celled foam material by heating the same at a temperature in the range of 140 degrees F. to 160 degrees F. until dry.

37. A rigid foam according to claim 33 in which the polyurethane foam is made from a polyether resin:
  the partially cured closed-cell foam structure is softened by heating to a temperature in the range of 250 degrees F. to 300 degrees F. for an interval in the range of 10 to 20 minutes;
  the closed cells of the softened partially cured foam are crushed by compressing the foam to approximately one-half of its original thickness to open the cells;
  the open-celled foam is reexpanded by heating at a temperature in the range of 250 degrees F. to 350 degrees F. for an interval in the range of 10 to 30 minutes to restore the foam to its original thickness;
  soaking the open-cell foam to impregnate the same in a dispersion of a mixture of toluene, phenolic spar varnish in an amount in the range of 17 to 20 parts by weight, of carbon black in an amount in the range of 3 to 4 parts by weight, and calcium titanite in an amount in the range of 0.5 to 2 parts by weight, each per 100 parts by weight of said toluene, whereby the open cells of the foam are impregnated with the carbon black and titanite;
  allowing the excess toluene to drain from the foam product; and
  drying the resultant cured impregnated open-celled polyurethane foam by heating the same at a temperature in the range of 140 degrees F. to 160 degrees F. until dry.

38. A rigid porous, deformation resisting, non-resilient inflexible, thermoset resin foam having macroscopic open cells formed by,
  admixing a modified polyepoxide produced by reacting a polyepoxide having a

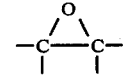

equivalency greater than one with a curing and hardening agent therefor, said curing and hardening agent being present in a relatively small amount and less than the amount sufficient to harden and cure the polyepoxide, a curing and hardening agent for epoxies in an amount sufficient to harden and completely cure the modified polyepoxide, and a decomposable blowing agent in an amount sufficient to foam the modified polyepoxide;
  gelling the resultant mixture by maintaining the same at a temperature in the range of 45 degrees F. to 130 degrees F. for an interval in the range of 6 to 24 hours;
  force foaming and partially curing the gelled product by heating to a temperature in the range of 90 degrees F. to 150 degrees F. to an interval in the range of 2 to 6 hours to form a closed-cell foam;
  softening the foam by heating at a temperature in the range of 150 degrees F. to 250 degrees F.;
  compressing and crushing the softened foam to open the cells; and
  reexpanding the crushed open-celled foam by heating to a temperature in the range of 150 degrees F. to 250 degrees F.

39. A rigid foam according to claim 38 including:
  soaking the open-celled foam in a dispersion produced by mixing a liquid carrier, and a filler in an amount in the range of 3 to 20 parts by weight, per 100 parts by weight of the carrier, whereby the foam cells are impregnated with the filler;
  removing the impregnated foam from the dispersion;
  allowing excess liquid carrier to drain from the foam; and
  drying and curing the resultant impregnated open-celled foam by heating.

40. A rigid porous deformation resisting, non-resilient, inflexible, rigid plastic thermoset resin foam structure having macroscopic open cells formed by,
admixing a modified polyepoxide produced by reacting a polyepoxide having a

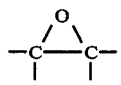

equivalency in the range of 175 to 210 produced by reacting bisphenol A and epichlorohydrin, a polyamide curing and hardening agent for polyepoxides produced by condensing a polybasic carboxylic acid having from 1 to 26 carbon atoms in the molecule with a polyamine formed from a polymerizable amine having from 2 to 26 carbon atoms in the molecule in an amount from 0.2 to 2 parts by weight per 100 parts by weight of said polyepoxide;
said reacting being carried on at a temperature in the range of 180 degrees F. to 220 degrees F. for a period of from ½ to 1½ hours;
ligroine in an amount in the range of 7 to 9 parts by weight;
4,4′ diamino diphenyl methane in an amount in the range of 23 to 27 parts by weight;
a blowing agent mixture of a polyepoxide having a

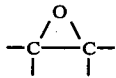

equivalency in the range of 175 to 210, and N,N′ dimethyl N,N′ dinitrosoterephthamide in an amount of 1 part by weight per 3 parts by weight of said polyepoxide, said blowing agent mixture being present in an amount in the range of 23 to 27 parts by weight;
a plasticizer comprising a liquid mixture of polysulfide polymers produced by condensing an alkaline polysulfide with a dihalide in an amount in the range of 9 to 11 parts by weight; and
triethylene tetramine in an amount in the range of 2 to 3 parts by weight, each per 100 parts by weight of modified polyepoxide;
gelling the resulting mixture in a mold by maintaining the same at a temperature in the range of 50 degrees F. to 90 degrees F. for a period in the range of 8 to 16 hours.
force foaming and partially curing the resultant gelled product by heating the same to a temperature in the range of 110 degrees F. to 130 degrees F. for an interval in the range of 3 to 5 hours;
heating the mixture at a temperature in the range of 140 degrees F. to 160 degrees F. for an interval in the range of 3 to 5 hours; and
subsequently heating the mixture to a temperature in the range of 190 degrees F. to 210 degrees F. for a period in the range of 50 to 70 minutes for each inch of thickness of the resulting closed-cell product;
softening the product to a temperature in the range of 195 degrees F. to 205 degrees F.;
compressing the closed-cell product to approximately one-half the original expanded thickness to cause the walls forming the closed cells to rupture to produce an open-celled product;
reexpanding the open-celled foam material by heating to a temperature in the range of 210 degrees F. to 215 degrees F. and maintaining the temperature for an interval in the range of 10 to 30 minutes.

41. A rigid foam according to claim 40 including:
soaking the open-celled foam in a dispersion produced by mixing toluene, phenolic spar varnish in an amount in the range of 17 to 20 parts by weight, carbon black an amount in the range of 3 to 4 parts by weight, and calcium titanite an amount in the range of 1.5 to 2 parts by weight, each per 100 parts by weight of said toluene, whereby the foam is impregnated with carbon black and calcium titanite;
removing the resulting open-celled foam product from the dispersion;
allowing excess toluene to drain from the foam product;
and
drying and curing the resultant impregnated open-celled foam by heating at a temperature in the range of 140 degrees F. to 160 degrees F. until dried.

42. A rigid foam according to claim 41 including:
finally curing the reexpanded foam by heating to a temperature in the range of 240 degrees F. to 270 degrees F. for a period of from 50 to 70 minutes per inch of thickness of the product.

43. A rigid foam according to claim 42 including impregnating the finally cured open-celled foam:
soaking the open-celled foam in a dispersion produced by mixing toluene, phenolic spar varnish in an amount in the range of 17 to 20 parts by weight, carbon black in an amount in the range of 3 to 4 parts by weight, and calcium titanite in an amount in the range of 1.5 to 2 parts by weight, each per 100 parts by weight of said toluene;
allowing the excess toluene to dry from the foam product; and
drying the resultant cured impregnated open-celled foam material by heating at a temperature in the range of 140 degrees F. to 160 degrees F. until dry.

44. A method of producing a deformation resisting, non-resilient, inflexible, rigid plastic thermosetting foam structure having open cells comprising:
admixing a modified polyepoxide produced by reacting a polyepoxide having a

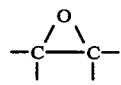

equivalency in the range of 175 to 210 produced by reacting bisphenol A and epichlorohydrin, a polyamide curing and hardening agent for polyepoxides produced by condensing a polybasic carboxylic acid having from 1 to 26 carbon atoms in the molecule with a polyamine formed from a polymerizable amine having from 2 to 26 carbon atoms in the molecule in an amount from 0.2 to 2 parts by weight per 100 parts by weight of said polyepoxide;

said reacting being carried on at a temperature in the range of 180 degrees F. to 220 degrees F. for a period of from ½ to 1½ hours;

ligroine in an amount in the range of 7 to 9 parts by weight;

4,4' diamino diphenyl methane in an amount in the range of 23 to 27 parts by weight;

a decomposable activated blowing agent adapted to produce $N_2$, $CO_2$, and $NH_3$ (trace) gases, said blowing agent mixture being present in an amount in the range of 23 to 27 parts by weight;

a plasticizer comprising a liquid mixture of polysulfide polymers produced by condensing an alkaline polysulfide with a dihalide in an amount in the range of 9 to 11 parts by weight; and triethylene tetramine in an amount in the range of 2 to 3 parts by weight, each per 100 parts by weight of modified polyepoxide;

gelling the resulting mixture in a mold by maintaining the same at a temperature in the range of 50 degrees F. to 90 degrees F. for a period in the range of 8 to 16 hours;

force foaming and partially curing the resultant gelled produced by heating the same to a temperature in the range of 110 degrees F. to 130 degrees F. for an interval in the range of 3 to 6 hours;

heating the mixture at a temperature in the range of 140 degrees F. to 160 degrees F. for an interval in the range of 2 to 5 hours; and subsequently heating the mixture to a temperature in the range of 190 degrees F. to 210 degrees F. for a period in the range of 50 to 70 minutes for each inch of thickness of the resulting closed-cell product;

softening the product at a temperature in the range of 280 degrees F. to 300 degrees F.;

compressing the closed-cell product to approximately one-half the original expanded thickness to cause the walls forming the closed cells to rupture to produce an open-celled product;

reexpanding the open-celled foam material to its original thickness by heating to a temperature in the range of 280 degrees F. to 300 degrees F. and maintaining the temperature for an interval in the range of 10 to 30 minutes.

45. A method according to claim 40 including:

soaking the open-celled foam in a dispersion produced by mixing toluene, phenolic spar varnish in an amount in the range of 17 to 20 parts by weight, carbon black in an amount in the range of 3 to 4 parts by weight, and calcium titanite an amount in the range of 1.5 to 2 parts by weight, each per 100 parts by weight of said toluene, whereby the foam is impregnated with carbon black and calcium titanite;

removing the resulting open-celled foam product from the dispersion;

allowing excess toluene to drain from the foam product; and drying and curing the resultant impregnated open-celled foam by heating at a temperature in the range of 140 degrees F. to 160 degrees F. until dried.

46. A method according to claim 44 including:

finally curing the reexpanded foam by heating to a temperature in the range of 280 degrees F. to 300 degrees F. for a period of from 50 to 70 minutes per inch of thickness of the product.

47. A method according to claim 46 including impregnating the finally cured open-celled foam:

soaking the open-celled foam in a dispersion produced by mixing toluene, phenolic spar varnish in an amount in the range of 17 to 20 parts by weight, carbon black in an amount in the range of 3 to 4 parts by weight, and calcium titanite in an amount in the range of 1.5 to 2 parts by weight, each per 100 parts by weight of said toluene;

allowing the excess toluene to dry from the foam product; and drying the resultant cured impregnated open-celled foam material by heating at a temperature in the range of 140 degrees F. to 160 degrees F. until dry.

48. A rigid porous deformation resisting, non-resilient, inflexible, rigid plastic thermoset resin foam structure having macroscopic open cells formed by, admixing a modified polyepoxide produced by reacting a polyepoxide having a $$-\underset{|}{C}\overset{O}{\overset{/\ \backslash}{-}}\underset{|}{C}-$$

equivalency in the range of 175 to 210 produced by reacting bisphenol A and epichlorohydrin, a polyamide curing and hardening agent for polyepoxides produced by condensing a polybasic carboxylic acid having from 1 to 26 carbon atoms in the molecule with a polyamine formed from a polymerizable amine having from 2 to 26 carbon atoms in the molecule in an amount from 0.2 to 2 parts by weight per 100 parts by weight of said polyepoxide;

said reacting being carried on at a temperature in the range of 180 degrees F. to 220 degrees F. for a period of from ½ to 1½ hours;

ligroine in an amount in the range of 7 to 9 parts by weight;

4,4' diamino diphenyl methane in an amount in the range of 23 to 27 parts by weight;

a decomposable activated blowing agent adapted to produce $N_2$, $CO_2$, and $NH_3$ (trace) gases, said blowing agent mixture being present in an amount in the range of 23 to 27 parts by weight;

a plasticizer comprising a liquid mixture of polysulfide polymers produced by condensing an alkaline polysulfide with a dihalide in an amount in the range of 9 to 11 parts by weight; and triethylene tetramine in an amount in the range of 2 to 3 parts by weight, each per 100 parts by weight of modified polyepoxide;

gelling the resulting mixture in a mold by maintaining the same at a temperature in the range of 50 degrees F. to 90 degrees F. for a period in the range of 8 to 16 hours;

force foaming and partially curing the resultant gelled product by heating the same to a temperature in the range of 110 degrees F. to 130 degrees F. for an interval in the range of 3 to 6 hours;

heating the mixture at a temperature in the range of 140 degrees F. to 160 degrees F. for an interval in the range of 2 to 5 hours; and subsequently heating the mixture to a temperature in the range of 190 degrees F. to 210 degrees F. for a period in the range of 50 to 70 minutes for each inch of thickness of the resulting closed-cell product;

softening the product to a temperature in the range of 280 degrees F. to 300 degrees F.;

compressing the closed-cell product to approximately one-half the original expanded thickness to cause the walls forming the closed cells to rupture to produce an open-celled product;

reexpanding the open-celled foam material to its original thickness by heating to a temperature in the range of 280 degrees F. to 300 degrees F. and maintaining the temperature for an interval in the range of 10 to 30 minutes.

49. A method of producing a deformation resisting, non-resilient, inflexible, rigid, plastic thermosetting foam structure having open cells comprising:

foaming and partially curing a foamable, curable resin mixture to a B-stage state of cure, the foam becoming rigid in the partial cure and having closed cells;

softening the partially cured foam;

compressing to crush the foam material to a thickness less than its original thickness in order to cause the walls forming the cells to rupture to produce an open-celled structure; and reexpanding the compressed open cell foam material.

* * * * *

UNITED STATES PATENT AND TRADEMARK OFFICE
CERTIFICATE OF CORRECTION

PATENT NO. : 4,454,248
DATED : June 12, 1984
INVENTOR(S) : Marlan R. Pollock and Marlyn F. Harp It is certified that error appears in the above-identified patent and that said Letters Patent are hereby corrected as shown below:

Column 4, line 47, "eqivalent" should be --equivalent--.

Column 10, line 47, "ethers" should be --esters--.

Column 14, line 9, "o-c$_2$H$_4$" should be --O-C$_2$H$_4$--.

Column 28, line 48, "formd" should be --formed--.

Column 31, line 52, "." should be --;--.

Column 33, line 24, "produced" should be --product--.

Signed and Sealed this

Nineteenth Day of March 1985

[SEAL]

Attest:

DONALD J. QUIGG

Attesting Officer     Acting Commissioner of Patents and Trademarks